US010103658B2

(12) United States Patent
Hidaka et al.

(10) Patent No.: US 10,103,658 B2
(45) Date of Patent: Oct. 16, 2018

(54) DRIVE CONTROL DEVICE AND FUEL PUMP DRIVE SYSTEM

(71) Applicant: DENSO CORPORATION, Kariya, Aichi-pref. (JP)

(72) Inventors: Yuuji Hidaka, Kariya (JP); Kiyoshi Nagata, Kariya (JP); Masaya Ootake, Kariya (JP); Hirokazu Toyoda, Kariya (JP); Manabu Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 368 days.

(21) Appl. No.: 15/032,061

(22) PCT Filed: Nov. 10, 2014

(86) PCT No.: PCT/JP2014/005622
§ 371 (c)(1),
(2) Date: Apr. 26, 2016

(87) PCT Pub. No.: WO2015/072124
PCT Pub. Date: May 21, 2015

(65) Prior Publication Data
US 2016/0268937 A1 Sep. 15, 2016

(30) Foreign Application Priority Data

Nov. 12, 2013 (JP) .................................. 2013-233828
Oct. 23, 2014 (JP) .................................. 2014-216139

(51) Int. Cl.
*H02P 6/04* (2016.01)
*H02P 6/20* (2016.01)
*H02P 6/182* (2016.01)
*H02P 6/22* (2006.01)
(Continued)

(52) U.S. Cl.
CPC .............. *H02P 6/20* (2013.01); *F02M 59/44* (2013.01); *F04D 5/002* (2013.01); *F04D 13/06* (2013.01);
(Continued)

(58) Field of Classification Search
CPC ..... B60L 11/14; B60W 10/08; Y02T 10/7077; B60K 17/356; B60K 6/40
See application file for complete search history.

(56) References Cited

U.S. PATENT DOCUMENTS 9,797,470 B2 * 10/2017 Lorenz .............. F16F 15/13157
2004/0212340 A1 * 10/2004 Itabashi .................... H02P 8/16
318/638

(Continued)

FOREIGN PATENT DOCUMENTS

JP H04-312390 A 11/1992
JP 2001-124101 A 5/2001
(Continued)

*Primary Examiner* — Shawki S Ismail
*Assistant Examiner* — Zoheb Imtiaz
(74) *Attorney, Agent, or Firm* — Posz Law Group, PLC

(57) ABSTRACT

A microcomputer of a drive control device for controlling the driving of a brushless motor has a positioning part and a torque acceleration control unit. The positioning unit controls the power to be supplied to the windings, to thereby position the rotor at a drive start position which is a position of the rotor relative to the stator at which the drive control of the brushless motor can start, before starting the drive control of the brushless motor. The torque acceleration control unit controls the power to be supplied to the windings so that a torque acceleration falls within a predetermined range that the collision stress generated when the outer wall of the end of the shaft collides with the inner wall of the hole of an impeller (rotating member) is equal to or smaller than a predetermined value, when the rotor is positioned.

9 Claims, 10 Drawing Sheets

(51) Int. Cl.
*F02M 59/44* (2006.01)
*F04D 25/06* (2006.01)
*H02K 7/00* (2006.01)
*F04D 5/00* (2006.01)
*F04D 13/06* (2006.01)
*F04D 15/00* (2006.01)
*F04D 29/20* (2006.01)
*H02P 6/18* (2016.01)

(52) U.S. Cl.
CPC ......... *F04D 15/0066* (2013.01); *F04D 25/06* (2013.01); *F04D 29/20* (2013.01); *H02K 7/003* (2013.01); *H02P 6/182* (2013.01); *H02P 6/188* (2013.01); *H02P 6/22* (2013.01); *H02P 2203/03* (2013.01)

(56) References Cited

U.S. PATENT DOCUMENTS

2006/0088431 A1* 4/2006 Berger .................... F04C 14/14
418/19
2012/0256510 A1* 10/2012 Yamada ................ H02K 19/12
310/184
2015/0091484 A1* 4/2015 Royak ................. H02M 5/4585
318/400.26

FOREIGN PATENT DOCUMENTS

| JP | 2007-236048 A | 9/2007 |
| JP | 2010-241165 A | 10/2010 |
| JP | 2011-036083 A | 2/2011 |

* cited by examiner

DRIVE CONTROL DEVICE AND FUEL PUMP DRIVE SYSTEM

CROSS REFERENCE TO RELATED APPLICATIONS

This application is a U.S. national stage application of International Patent Application No. PCT/JP2014/005622 filed on Nov. 10, 2014 and is based on Japanese Patent Applications No. 2013-233828 filed on Nov. 12, 2013 and No. 2014-216139 filed on Oct. 23, 2014, the disclosures of which are incorporated herein by reference.

TECHNICAL FIELD

The present disclosure relates to a drive control device and a fuel pump drive system using the device.

BACKGROUND

Up to now, a drive control device that controls the driving of a brushless motor having no sensor for detecting a position of a rotor has been known. For example, Patent Literature 1 discloses an example in which the driving of the brushless motor used as a drive source of a fuel pump is controlled by the drive control device.

In the case of a sensorless brushless motor having no sensor for detecting the position of the rotor, the position of the rotor relative to a stator is unknown in a state where the rotor stops before the drive control starts. Therefore, there is a need to start the drive control after the rotor has been forcedly located at a drive start position which is a position of the rotor relative to the stator where the drive control can be started. In the drive control device of Patent Literature 1, the energization of multi-phase windings is switched to detect a position of the rotor relative to the stator. The drive start position is determined on the basis of the detected position of the rotor, and the rotor is located at the determined drive start position. As a result, a time required until the drive control start of the brushless motor is reduced.

In the drive control device of Patent Literature 1, when the position detection and the positioning described above are performed, the rotor is rotated in one direction (forward direction) or the other direction (reverse direction) depending on the position of the rotor relative to the stator at the time of energization. In general, when the brushless motor is used as a drive source of the fuel pump, a shaft of the brushless motor is fitted into a hole of an impeller, and the brushless motor is driven to rotate the impeller. In general, an end of the shaft and the hole of the impeller are D-shaped in a cross section. Moreover, in order to absorb a manufacturing error and an assembly error of the impeller, a predetermined clearance is defined between the end of the shaft and the hole of the impeller. For that reason, when the shaft starts to rotate, a corner of an outer wall of the end of the shaft may collide with a planar part of an inner wall of the hole of the impeller.

When the brushless motor of the fuel pump is driven by the drive control device of Patent Literature 1, the shaft is rotated in the forward direction or the reverse direction every time the energization of the windings is switched, during the positioning prior to the drive control start. For that reason, for example, there is no need to position the rotor, and as compared with a case in which a motor with brush which rotates only in the forward direction is driven, the number of times when the outer wall of the end of the shaft collides with the inner wall of the hole of the impeller, and a collision stress during the collision are increased. This leads to a risk that the impeller may be abraded or damaged. In particular, in idling stop vehicles and hybrid vehicles popular in recent years, because the number of times of turning on and off the fuel pump in a predetermined period of time is large, there is a concern about the promotion of abrasion of the impeller or an increase in the damage due to the collision of the shaft.

PATENT LITERATURE

Patent Literature 1: JP 2011-36083 A

SUMMARY

The present disclosure has been made in view of the above-mentioned matters and an object of the present disclosure is to provide a drive control device capable of suppressing the abrasion and the damage of a rotating member rotationally driven by a brushless motor, and a fuel pump drive system that drives a brushless motor of a fuel pump with the use of the drive control device.

According to an aspect of the present disclosure, a drive control device controls the driving of a brushless motor having a stator on which multi-phase windings are wound, a rotor that is disposed to be rotatable relative to the stator, and a shaft that is disposed in the center of the rotor, has an end fitted into a hole of the rotating member, and rotates together with the rotor. The drive control device includes a control unit.

The control unit operates an energization output including at least one of a current, a voltage and a power, and controls a power to be supplied to the windings, thereby being capable of controlling the rotation of the rotor.

The control unit has a positioning unit and a torque acceleration control unit.

The positioning unit controls the power to be supplied to the windings, to thereby position the rotor to a drive start position which is a position of the rotor relative to the stator at which the drive control of the brushless motor can start, before starting the drive control of the brushless motor.

The torque acceleration control unit controls the power to be supplied to the windings so that a torque acceleration, which is a time variation in a torque output from the shaft of the brushless motor, falls within a predetermined range that the collision stress generated when the outer wall of the end of the shaft collides with the inner wall of the hole of the rotating member is equal to or smaller than a predetermined value, when the rotor is positioned by the positioning unit.

For that reason, in the present disclosure, when the rotor is positioned before the drive control of the brushless motor starts, the collision stress generated when the outer wall of the shaft collides with the inner wall of the rotating member can be set to be equal to or smaller than the predetermined value. As a result, the abrasion and the damage of the rotating member caused when the outer wall of the shaft collides with the inner wall of the rotating member can be suppressed. This effect is remarkable particularly in the case of controlling the driving of the brushless motor which is large in the number of times of the on/off operation within the predetermined period.

The fuel pump drive system according to the present disclosure includes a fuel pump and the above-mentioned drive control device that controls the driving of the brushless motor.

The fuel pump includes a brushless motor that can output a torque while rotating a shaft of the brushless motor, a housing that houses the brushless motor, a pump cover that has a suction part and covers one end of the housing, a cover end that has a discharge part and covers the other end of the housing, and a rotating member that has a hole defined in the center of the fuel pump into which an end of the shaft is fitted, and pressurizes a fuel flowing from the suction part and discharges the fuel from the discharge part while rotating together with the shaft.

In the fuel pump drive system according to the present disclosure, the collision stress generated when the outer wall of the shaft collides with the inner wall of the rotating member can be reduced to a value equal to or smaller than the predetermined value when positioning the rotor before the drive control starts. For that reason, the abrasion and the damage of the rotating member of the fuel pump can be suppressed.

DETAILED DESCRIPTION

Figure 1:
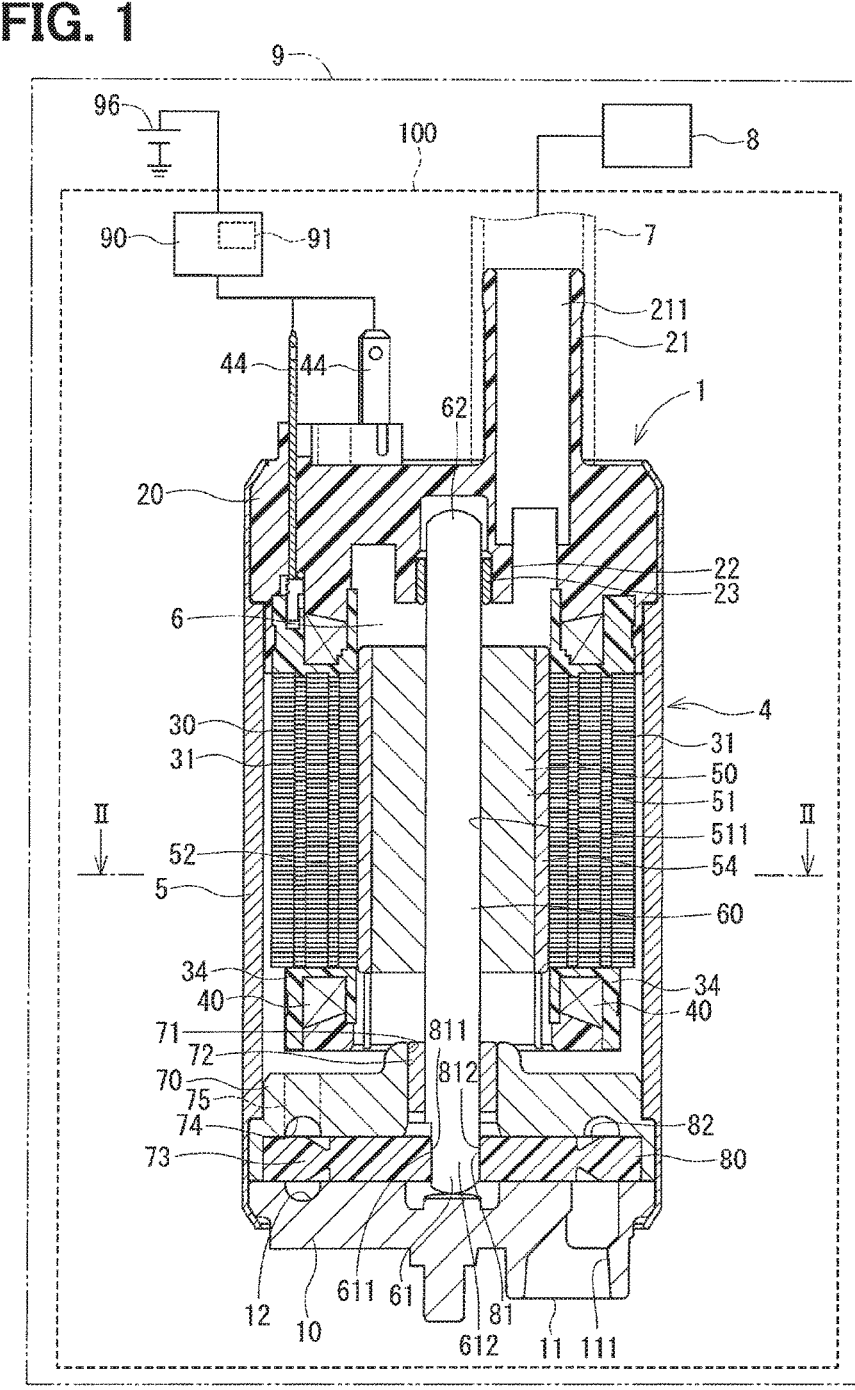
FIG. 1 is a cross-sectional view illustrating a drive control device according to a first embodiment of the present disclosure, and a fuel pump.

Hereinafter, a description will be given of a drive control device according to embodiments of the present disclosure and a fuel pump drive system that controls the driving of a brushless motor of a fuel pump with the use of the drive control device with reference to the drawings. In order to prevent the illustration of the drawings from being complicated, only one or some of the plural same members or portions in each drawing may be denoted by reference numerals.

First Embodiment

A first embodiment according to the present disclosure will be described with reference to FIGS. 1 to 9.

A fuel pump drive system 100 illustrated in FIG. 1 is mounted in a vehicle 9, and includes a fuel pump 1 and a drive control device 90. The fuel pump 1 is driven by an electric power supplied from, for example, a battery 96 of the vehicle 9, suctions a fuel in a fuel tank not shown, and discharges and supplies the fuel into an internal combustion engine 8 as a fuel supply target. In particular, when the vehicle 9 is an idling stop vehicle or a hybrid vehicle, the on/off frequency of the fuel pump 1 within a predetermined period corresponding to an expected use period of the vehicle 9, in other words, the number of restart after stop is increased.

The fuel pump 1 includes a brushless motor 4, a housing 5, a pump cover 10, a cover end 20, and an impeller 80 as "rotating member".

The brushless motor 4 includes a stator 30, a winding 40, a rotor 50, and a shaft 60.

Figure 2:
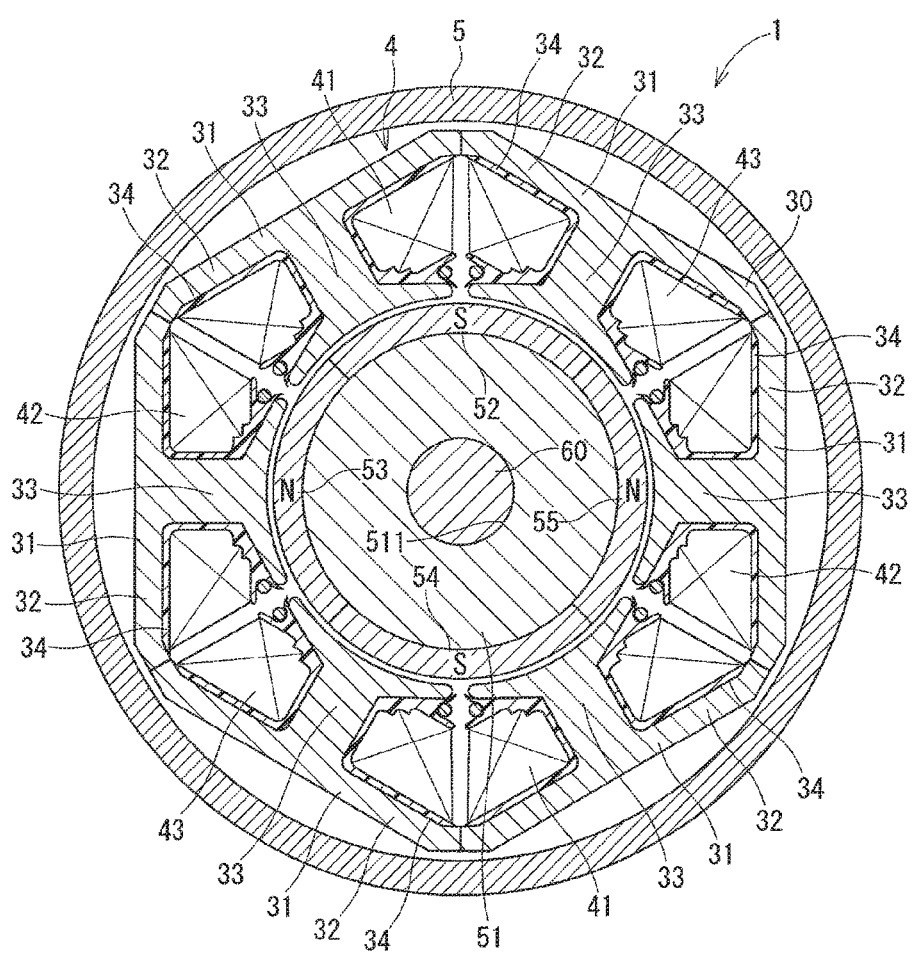
FIG. 2 is a cross-sectional view taken along a line II-II in FIG. 1.

As illustrated in FIG. 2, the stator 30 includes a segment 31 and an insulator 34.

The segments 31 are each formed of a laminated core into which thin sheets of magnetic material are laminated. In the present embodiment, six segments 31 are provided. Each of the segments 31 includes a yoke part 32 and a teeth part 33. The stator 30 is formed into a cylindrical shape in which six yoke parts 32 form a hexagonal cylinder. The teeth parts 33 are formed to extend toward a radially inner side from the center of the yoke part 32. The insulators 34 are made of resin, and disposed in the teeth parts 33 of the segments 31.

The winding 40 is made of a metal such as copper, includes a U-phase winding 41, a V-phase winding 42, and a W-phase winding 43, and are wound on the insulators 34 so as to be disposed in the teeth part 33 of the stator 30. The U-phase winding 41 configures a U-phase of the brushless motor 4, the V-phase winding 42 configures a V-phase, and the W-phase winding 43 configures a W-phase.

The rotor 50 is formed into a cylindrical shape, and includes a core 51 and magnets 52, 53, 54 and 55. The rotor 50 is rotatably disposed inside of the stator 30.

The core 51 is formed into a substantially cylindrical shape, and has a hole 511 in the center of the core 51. The magnets 52, 53, 54 and 55 are arrayed on an outer wall of the core 51 in a peripheral direction. The magnets 52 and 54 are magnetized so that a magnetism of the rotor 50 in a radially outer side becomes S-pole. The magnets 53 and 55 are magnetized so that a magnetism of the rotor 50 in a radially outer side becomes N-pole. In other words, the outer wall of the rotor 50 is magnetized so that the magnetisms are alternately different from each other in the peripheral direction.

As described above, in the present embodiment, the brushless motor 4 is a three-phase brushless motor with four poles (two pole pairs) and six slots. The present embodiment has no position sensor that can detect the position of the rotor 50 of the brushless motor 4. In other words, the brushless motor 4 is a brushless motor of a position sensorless (hereinafter referred to merely as "sensorless") type. In the present embodiment, because the on/off frequency of the fuel pump 1 within the predetermined period is large, the on/off frequency of the brushless motor 4 within the predetermined period is also larger.

The shaft 60 is formed into a rod shape, that is, a slender cylindrical shape made of metal such as stainless steel. The shaft 60 is fitted into the hole 511 of the core 51 in the rotor 50. As a result, the shaft 60 is rotatably integrated with the rotor 50.

Figure 3:
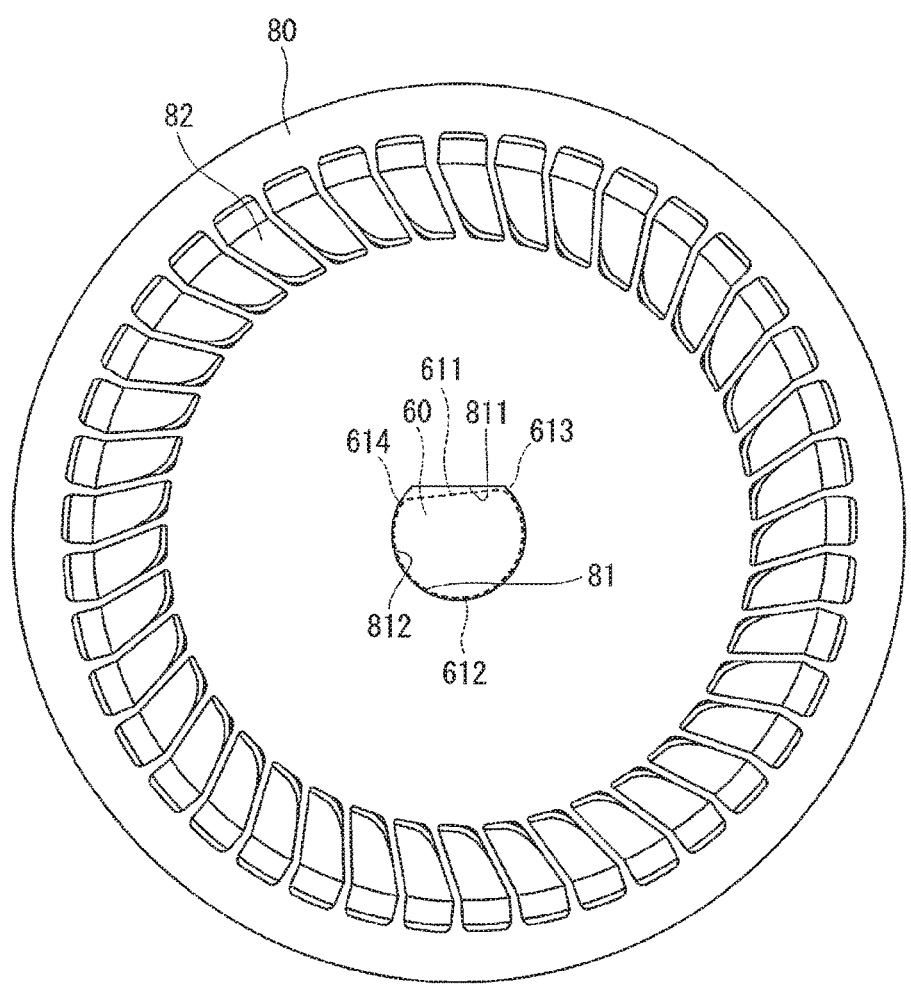
FIG. 3 is a diagram illustrating an impeller of the fuel pump according to the first embodiment of the present disclosure.

In the present embodiment, one end 61 of the shaft 60 is formed so that a cross-section perpendicular to an axis is D-shaped (refer to FIG. 3). With this configuration, one end 61 of the shaft 60 is formed with a planar outer wall 611 and a curved outer wall 612. Corners 613 and 614 including a boundary between the outer wall 611 and the outer wall 612 are chamfered into respective smooth curved surfaces.

The housing 5 is formed into a substantially cylinder shape made of metal such as iron. A surface of the housing 5 is plated with, for example, zinc or tin.

The pump cover 10 is formed into a substantially disk shape made of metal such as aluminum, and closes one end of the housing 5. The pump cover 10 is fixed inside of the housing 5 by crimping one end of the housing 5 toward a radially inner side, and the omission of the pump cover 10 in the axial direction is regulated. As illustrated in FIG. 1, the pump cover 10 has a cylindrical suction part 11. A suction passage 111 that penetrates through the pump cover 10 in a thickness direction is defined inside of the suction part 11.

The cover end 20 is formed into a disk shape made of, for example, resin, and closes the other end of the housing 5. An outer edge of the cover end 20 is pressed into an inside of the other end of the housing 5. The cover end 20 is fixed inside of the housing 5 by crimping the other end of the housing 5 toward the radially inner side, and the omission of the cover end 20 in the axial direction is regulated.

As illustrated in FIG. 1, the segments 31, the insulators 34, and the winding 40 configuring the stator 30 are molded with a resin forming the cover end 20. In other words, the stator 30 is molded with resin, and integrated with the cover end 20. In this way, the stator 30 is housed inside of the housing 5 coaxially with the housing 5.

A pump casing 70 is disposed between the pump cover 10 and the stator 30. The pump casing 70 is formed into a substantially disk shape made of metal such as aluminum. A hole 71 that penetrates through the pump casing 70 in the thickness direction is defined in the center of the pump casing 70. A bearing member 72 is fitted into the hole 71 of the pump casing 70. The bearing member 72 is formed into a cylindrical shape made of, for example, a copper based sintered metal.

A bearing 22 is formed in the center of an end surface of the cover end 20 on the rotor 50 side. The bearing 22 is formed in the center of the cover end 20 so as to protrude toward the rotor 50 side in a cylindrical shape. A center axis of the bearing 22 matches a center axis of the cover end 20. In other words, the bearing 22 is disposed on the center axis of the cover end 20. A bearing member 23 is fitted into an inside of the bearing 22. The bearing member 23 is formed into a cylindrical shape made of, for example, a copper based sintered metal as with the bearing member 72.

The hole 71 of the pump casing 70 supports the one end 61 side of the shaft 60 located within a pump chamber 73 through the bearing member 72. The bearing 22 of the cover end 20 supports the other end 62 side of the shaft 60 through the bearing member 23. As a result, the rotor 50 and the shaft 60 are rotatably supported to the pump casing 70 and the cover end 20 through the bearing member 72 and the hole 71, and the bearing member 23 and the bearing 22, respectively.

The impeller 80 is formed into a substantially disk shape made of resin such as PPS, and housed in the substantially disk-shaped pump chamber 73 defined between the pump cover 10 and the pump casing 70. The impeller 80 has a hole 81 that penetrates through the center of the impeller 80 in the thickness direction. The hole 81 is formed into a D-shape corresponding to a cross-sectional shape of the one end 61 of the shaft 60. As a result, a planar inner wall 811 and a curved inner wall 812 are formed in the hole 81.

The one end 61 of the shaft 60 is fitted into the hole 81 of the impeller 80. With this configuration, when the shaft 60 rotates together with the rotor 50, the impeller 80 rotates within the pump chamber 73.

In the present embodiment, a predetermined clearance is defined between the one end 61 of the shaft 60 and the hole 81 in a state where the one end 61 of the shaft 60 is fitted into the hole 81 (refer to FIG. 3). A manufacturing error and an assembly error of the impeller 60 can be absorbed by the clearance.

A substantially C-shaped groove 12 is defined in a surface of the pump cover 10 on the impeller 80 side. The groove 12 is connected to the suction passage 111. A substantially C-shaped groove 74 is defined in a surface of the pump casing 70 on the impeller 80 side. A passage 75 that penetrates through the pump casing 70 in the thickness direction is defined in the groove 74. Blade parts 82 are formed in the impeller 80 at positions corresponding to the groove 12 and the groove 74.

The cover end 20 is equipped with a discharge part 21. The discharge part 21 is made of resin and integrated with the cover end 20 so as to protrude from an end surface of the cover end 20 opposite to the pump cover 10 in a cylindrical shape. An inside of the discharge part 21 is provided with a discharge passage 211. The discharge passage 211 communicates with a space 6 between the pump cover 10 and the cover end 20 inside of the housing 10.

As illustrated in FIG. 1, the discharge part 21 is connected to the other end of a supply pipe 7 having one end connected to the internal combustion engine 8. The fuel pressurized by the rotation of the impeller 80 in a space 6 flows in the discharge passage 211, is discharged from the discharge part 21, and supplied to the internal combustion engine 8 through the supply pipe 7.

The cover end 20 is provided with terminals 44 (refer to FIG. 1). The terminals 44 are each made of metal such as copper, and formed into a rod shape. In the present embodiment, three terminals 44 are provided, and one ends of those terminals are connected to the U-phase winding 41, the V-phase winding 42, and the W-phase winding 43, and the other ends of those terminals are embedded in the cover end 20 so as to be exposed from an end surface of the cover end 20 opposite to the pump cover 10.

The drive control device 90 is a fuel pump controller (FPC) that controls the driving of the brushless motor 4 in the fuel pump 1. The drive control device 90 is connected to the terminals 44 and the battery 96, converts an electric power input from the battery 96 into a three-phase power, and supplies the converted power to the brushless motor 4.

Figure 4:
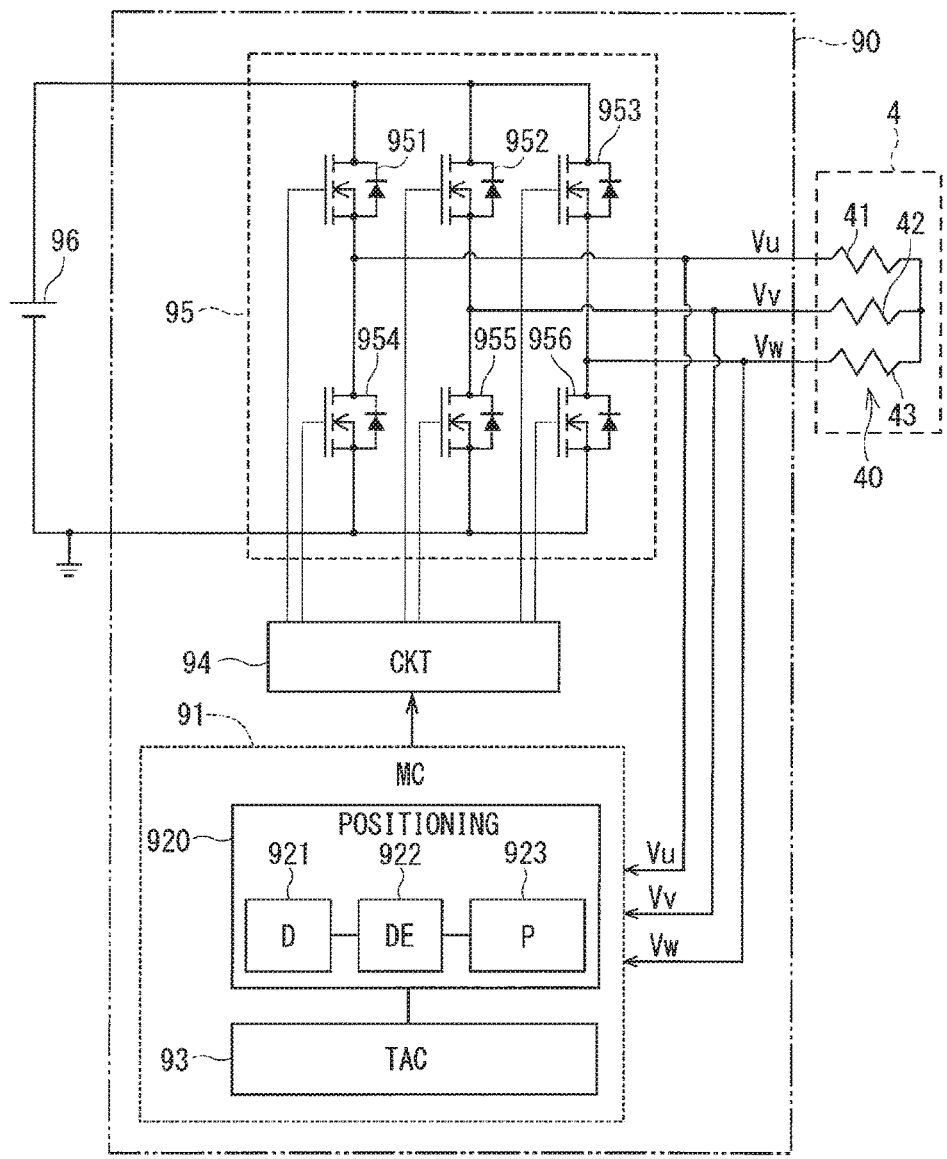
FIG. 4 is a schematic view illustrating a circuit configuration of the drive control device according to the first embodiment of the present disclosure.

As illustrated in FIG. 4, the drive control device 90 includes a microcomputer 91, a drive circuit 94, and a three-phase inverter 95.

The three-phase inverter 95 has six switching devices 951 to 956 connected to each other in a bridge manner so as to switch the energization of the winding 40 (U-phase winding 41, V-phase winding 42, W-phase winding 43). In the present embodiment, a metal oxide semiconductor field effect transistor (MOSFET) is used as each of the switching devices 951 to 956. Hereinafter, the switching devices 951 to 956 are appropriately called "MOSs 951 to 956".

Drains of the three high potential MOSs 951 to 953 are connected to a positive electrode side of the battery 96. Sources of the MOSs 951 to 953 are connected to drains of the low potential MOSs 954 to 956, respectively. Sources of the MOSs 954 to 956 are connected to a negative electrode side of the battery 96, that is, a ground.

As illustrated in FIG. 4, a connection point of the paired MOSs 951 and 954 is connected to one end of the U-phase winding 41. A connection point of the paired MOSs 952 and 955 is connected to one end of the V-phase winding 42. A connection point of the paired MOSs 953 and 956 is connected to one end of the W-phase winding 43.

The microcomputer 91 as "control unit" is a compact computer having a CPU, a ROM, a RAM, and an I/O, and performs a calculation according to a program stored in the ROM on the basis of an input signal, generates a control signal, and outputs the control signal to the drive circuit 94.

Specifically, the microcomputer 91 operates an energization output including at least one of a current, a voltage, and an electric power, and controls the power to be supplied from the three-phase inverter 95 to the winding 40, to thereby control a rotating speed and a torque of the brushless motor 4.

The microcomputer 91 according to the present embodiment acquires voltages applied to the U-phase winding 41, the V-phase winding 42, and the W-phase winding 43. As a result, for example, the microcomputer 91 can detect an induced voltage generated in a deenergized phase during two-phase energization.

Further, the microcomputer 91 has a positioning unit 920 for positioning the rotor 50 before starting the brushless motor 4, and a torque acceleration control unit 93 that operates an energization output, and controls the power to be supplied to the winding 40 so that a torque acceleration of the shaft 60 at the time of positioning falls within a predetermined range as a configuration for controlling the brushless motor 4 in a sensorless manner. The positioning unit 920 includes a positioning detection unit 921, a positioning determination unit 922, and a positioning processing unit 923.

Those respective units do not need to be provided in a physically independent configuration, and one microcomputer 91 may function as the positioning unit 920 or function as the torque acceleration control unit 93. The detailed operation of the respective units will be described later.

The drive circuit 94 generates a signal for switching the on/off operation of the MOSs 951 to 956 configuring the three-phase inverter 95 on the basis of a control signals input from the microcomputer 91, and outputs the generated signal to gates of the MOSs 951 to 956. As a result, the MOSs 951 to 956 perform switching operation, and the power is supplied from the battery 96 to the winding 40 (U-phase winding 41, V-phase winding 42, W-phase winding 43).

When the microcomputer 91 switches the energization of the U-phase winding 41, the V-phase winding 42, and the W-phase winding 43 through the drive circuit 94 and the MOSs 951 to 956, a rotating magnetic field is developed in the stator 30, and the rotor 50 rotates. When the rotor 50 rotates together with the shaft 60, the impeller 80 into which the shaft 60 is fitted rotates.

Subsequently, the "start of the drive control" of the brushless motor 4 will be described. Hereinafter, "start of the drive control" is used with the same meaning as that of "start".

The brushless motor 4 of the present embodiment is of the sensorless type, and therefore a position of the rotor 50 relative to the stator 30 is unknown in a state where the rotor 50 stops before the drive control starts. For that reason, there is a need to start the drive control upon forcedly positioning the rotor 50 at "drive start position" (position that becomes an N pole in the stator 30 when the winding 40 is energized) which is a position of the rotor 50 relative to the stator 30 at which the drive control can start. A control for positioning the rotor 50 which is executed by the microcomputer 91 before the drive control starts is called "positioning control".

Figure 5A:
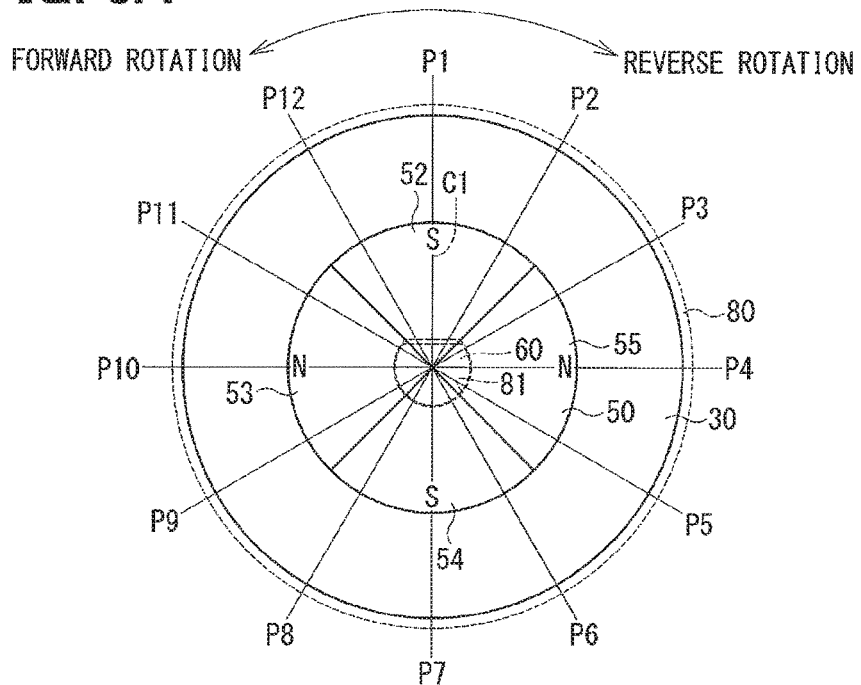
FIG. 5A is a schematic view illustrating a state of a rotor which is located at a position corresponding to a drive start position.
Figure 5B:
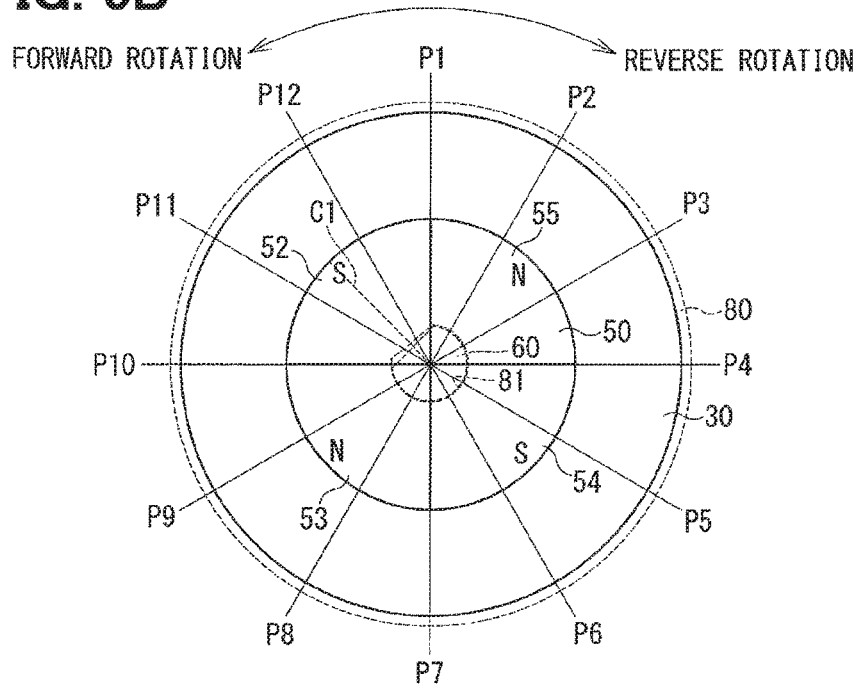
FIG. 5B is a schematic view illustrating a state of the rotor which is located at a position other than the position corresponding to the drive start position.

The brushless motor 4 according to the present embodiment is configured with four poles and six slots, and therefore as illustrated in FIGS. 5A and 5B, the "drive start position" can be set to any one of 12 places (positions (angles) P1 to P12). Hence, when the centers of the magnets 52 to 55 in the rotor 50 are located at any positions of the positions P1 to P12, the drive control of the brushless motor 4 can be started (FIG. 5A).

A "forward rotation direction" indicated in FIGS. 5A and 5B is a rotating direction of the rotor 50 (shaft 60) in which the impeller 80 can pressurize the fuel, and a "reverse rotation direction" is a rotating direction of the rotor 50 (shaft 60) in which the impeller 80 cannot pressurize the fuel. The forward and reverse of the rotating direction are appropriately set according to the arrangement of the respective-phase windings 41, 42, and 43, and a viewing direction of the impeller 80.

Now, a positional relationship of relative rotation of the shaft 60 and the impeller 80 at the time of stopping, positioning, and starting the brushless motor 4 will be described with reference to FIGS. 6A to 6D. The shaft 60 and the impeller 80 relatively rotate coaxially with a rotating axis O. In FIGS. 9 to 12 which will be descried later, the stopping time corresponds to a section I of the times t0 to t1, and the positioning time corresponds to sections III and IV of times t2 to t6. The starting time corresponds to a section VI after a time t7.

Figure 6A:
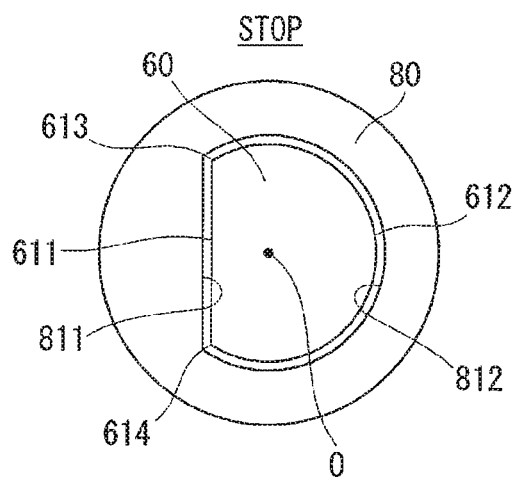
FIG. 6A is a schematic view illustrating a positional relationship between a shaft and an impeller when a brushless motor stops.

As illustrated in FIG. 6A, during the stop of the brushless motor 4, the shaft 60 is located at a neutral position relative to the hole 81 of the impeller 80.

Figure 6B:
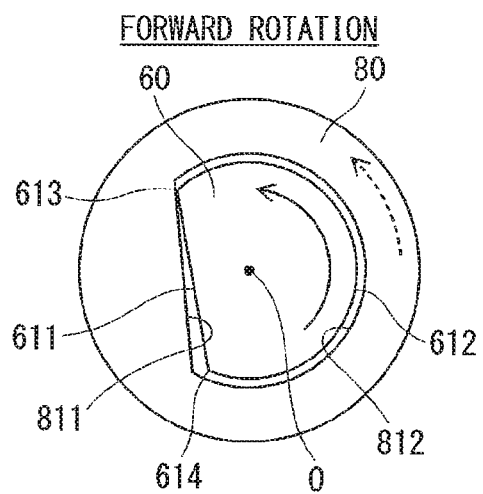
FIG. 6B is a schematic view illustrating a positional relationship between the shaft and the impeller at the time of positioning the brushless motor.
Figure 6C:
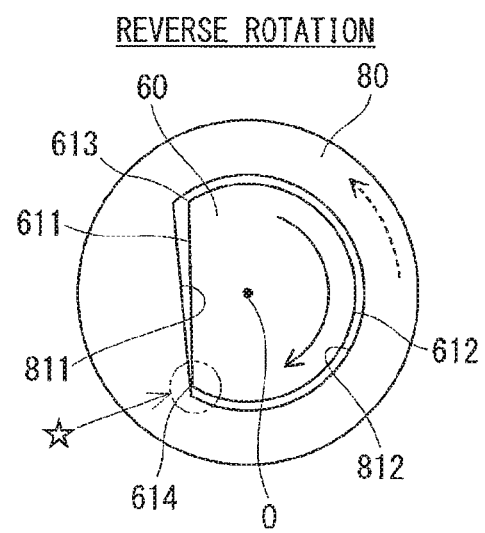
FIG. 6C is a schematic view illustrating a positional relationship between the shaft and the impeller at the time of positioning the brushless motor.

As illustrated in FIGS. 6B and 6C, during the positioning operation, the shaft 60 rotates forward or reversely up to the drive start position according to the position of the rotor 50. In the case of the forward rotation (FIG. 6B), the one corner 613 of the shaft 60 collides with the inner wall 811 of the hole 81 in the impeller 80, and in the case of the reverse rotation (FIG. 6C), the other corner 614 of the shaft 60 collides with the inner wall 811 of the hole 81 in the impeller 80 at a portion indicated by a star mark.

Figure 6D:
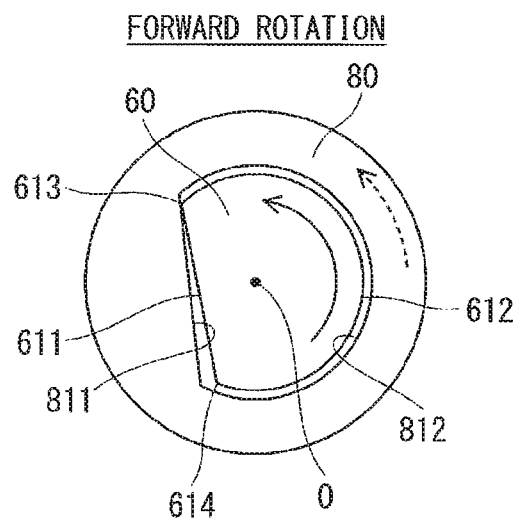
FIG. 6D is a schematic view illustrating a positional relationship between the shaft and the impeller when the brushless motor starts.

As illustrated in FIG. 6D, during the starting operation, the brushless motor 4 rotates forward in a state where the one corner 613 of the shaft 60 abuts against the inner wall 811 of the hole 81 in the impeller 80.

In the case of the brush motor whose rotating direction is one direction (forward rotation direction), the one corner 613 of the shaft 60 always abuts against the inner wall 811 of the hole 81 in the impeller 80. On the contrary, in the brushless motor, the rotating direction for positioning is changed for each starting. Because any one of the corners 613 and 614 of the shaft 60 collides with the inner wall 811 of the hole 81 each time the brushless motor 4 starts, the abrasion and the damage of the impeller 80 are likely to be promoted.

Hereinafter, as a description of the collision, the accurate description of "the outer wall of the one end 61 of the shaft 60 collides with the inner wall of the hole 81 in the impeller 80" may be appropriately simplified to "shaft 60 (outer wall of the shaft 60) collides with the impeller 80 (inner wall of the impeller 80)".

Subsequently, the operation of the respective units of the microcomputer 91 according to the present embodiment will be described.

The positioning unit 920 controls the power to be supplied to the winding 40, to thereby position the rotor 50 to any drive start position (positions P1 to P12) at which the drive control of the brushless motor 4 can start, before starting the drive control of the brushless motor 4.

The torque acceleration control unit 93 operates the energization output, and controls the power to be supplied to the winding 40 so that a torque acceleration, which is an acceleration of a torque output from the shaft 60, falls within a predetermined range that "the collision stress generated when the outer wall 611 of the shaft 60 collides with the inner wall 811 of the impeller 80 is equal to or smaller than a predetermined value", when the positioning unit 920 positions the rotor 50.

As described above, the present embodiment is characterized in that "collision stress relaxation control" for relaxing the collision stress between the shaft 60 and the impeller 80 is executed in the positioning control.

Figure 7:
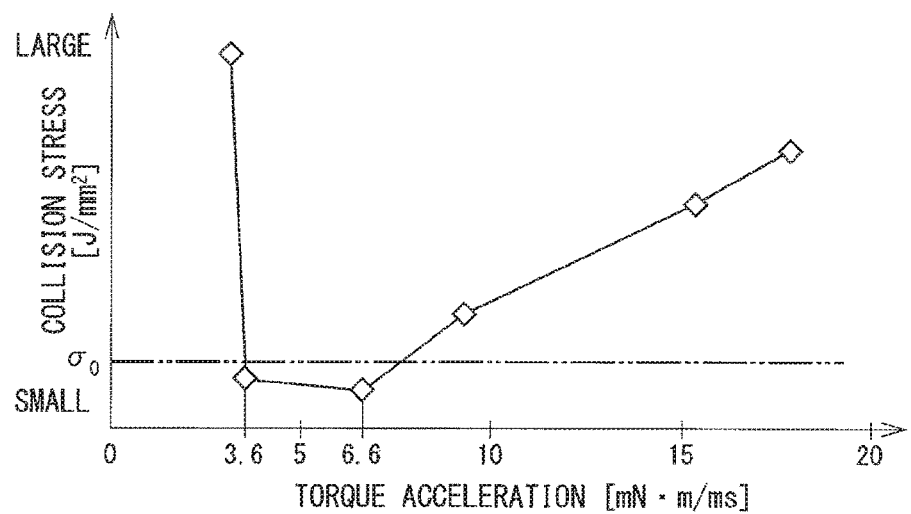
FIG. 7 is a diagram illustrating a relationship between a torque acceleration of a shaft of the fuel pump and a collision stress exerted on the impeller when the shaft collides with the impeller according to the first embodiment of the present disclosure.

In this example, it is desirable that the above predetermined range is set on the basis of an experimental result illustrated in FIG. 7.

FIG. 7 illustrates a relationship between a torque acceleration and a collision stress of the shaft 60 when the outer wall of the shaft 60 collides with the inner wall of the impeller 80. The torque acceleration [mN·m/ms] is a temporal change rate of the torque, and, for example, reflects the energization output such as a current change rate [A/ms] which is output by the microcomputer 91. The collision stress [J/mm$^2$] is a value obtained by dividing a collision energy proportional to the torque acceleration by a force receiving area at the time of collision.

As illustrated in FIG. 7, in an area where the torque acceleration is equal to or larger than 6.6 N·m/ms, the collision energy becomes larger as the torque acceleration is larger, and the collision stress increases. On the other hand, in an area where the torque acceleration is equal to or smaller than 3.6 N·m/ms, only the corners 613 and 614 of the shaft 60 collide with the inner wall 811 of the hole 81, an effect that the force receiving area is reduced becomes remarkable, and the collision stress increases. In an area where the torque acceleration falls within a range of 3.6 to 6.6 N·m/ms, the collision stress becomes equal to or smaller than a predetermined value σ0. Therefore, it is desirable that the above "predetermined range" is set to 3.6 to 6.6 mN·m/ms.

The positioning unit 920 according to the present embodiment includes the positioning detection unit 921, the positioning determination unit 922, and the positioning processing unit 923. The positioning detection unit 921 rotates the stopping rotor 50 by energization of the winding 40, and detects a position of the rotor 50 relative to the stator 30. Specifically, the positioning detection unit 921 energizes two phases of the U-phase winding 41, the V-phase winding 42, and the W-phase winding 43, and forcedly rotates the rotor 50. The positioning detection unit 921 detects an induced voltage generated in the winding 40 of the deenergized phase with the rotation of the rotor 50, to thereby detect the position of the rotor 50 relative to the stator 30. In this situation, the positioning detection unit 921 can detect the rotating direction of the rotor 50 with a change in the detected induced voltage.

The positioning determination unit 922 determines the "drive start position" on the basis of the detected position and rotating direction of the rotor 50. Specifically, for example, as illustrated in FIG. 5B, when it is detected that a center C1 (S-pole) of the magnet 52 in the rotor 50 is located between the position P11 and the position P12, and the rotor 50 rotates in the reverse direction, the positioning determination unit 922 determines the position P11 as "drive start position".

The positioning processing unit 923 switches the energization of the winding 40 so as to position the rotor 50 at the "drive start position" determined by the positioning determination unit 922, to thereby rotate the rotor 50. Specifically, the positioning processing unit 923 energizes the three phases, to thereby position the rotor 50 so that the center C1 of the magnet 52 in the rotor 50 overlaps with the position P11 (determined by the position detection unit) illustrated in, for example, FIG. 5B.

As described above, the positioning unit 920 energizes the winding 40 at least twice in total including one time for detecting the position of the rotor 50 and another time for positioning, from a state where the rotor 50 is stopping until the rotor 50 is positioned at the "drive start position". In other words, the positioning unit 920 switches the energization of the winding 40 at least once.

The torque acceleration control unit 93 operates the energization output, and controls the power to be supplied to the winding 40 so that the torque acceleration after the outer wall of the shaft 60 has collided with the inner wall of the impeller 80 becomes larger than the torque acceleration before the shaft 60 collides with the impeller 80. As a result, the rotor 50 can be quickly positioned at the "drive start position" while the collision stress when the shaft 60 collides with the impeller 80 is suppressed. The microcomputer 91 detects, for example, a change in the induced voltage generated in the winding 40, thereby being capable of detecting that the outer wall of the shaft 60 collides with the inner wall of the impeller 80.

Further, the torque acceleration control unit 93 operates the energization output, and controls the power to be supplied to the winding 40 so that the torque acceleration becomes a predetermined target value under the PI control.

Next, the operation of the drive control device 90 according to the first embodiment will be described with reference to FIG. 8.

Figure 8:
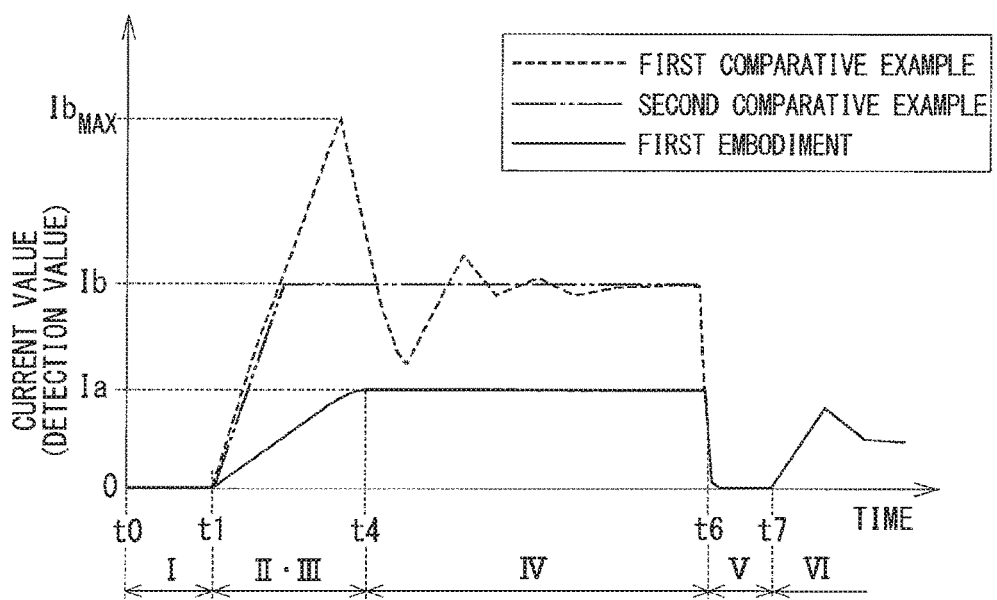
FIG. 8 is a time chart illustrating currents flowing in the brushless motor of the fuel pump in the drive control devices according to the first embodiment of the present disclosure and a comparative example.

FIG. 8 illustrates a change in a current value (detection value) flowing in the brushless motor 4 with time when the brushless motor 4 is driven under the control of the drive control device 90, by a solid line.

At the time t0 illustrated in FIG. 8, because the rotor 50 stops, the current value is "0". Symbols of the subsequent times are indicated by "t1, t4, t6, t7" for matching with FIGS. 9 to 12 described later. Section symbols I to VI used in FIGS. 9 to 12 are described as reference.

When the microcomputer 91 starts the positioning control of the rotor 50 at a time t1, the current value gradually increases. In the present embodiment, when positioning the rotor 50, the microcomputer 91 controls the power to be supplied to the winding 40 so that a torque acceleration, which is an acceleration of a torque output from the shaft 60, falls within a predetermined range that "the collision stress generated when the outer wall 611 of the shaft 60 collides with the inner wall 811 of the impeller 80 is equal to or smaller than a predetermined value. Therefore, an inclination of the current value after the time t1 is relatively small.

In the present embodiment, because the torque acceleration control unit 93 controls the power to be supplied to the winding 40 so that the torque acceleration reaches the predetermined target value under the PI control, the current value converges on a predetermined target value "Ia" at a time t4.

Upon completion of the positioning of the rotor 50 at a time t6, the microcomputer 91 stops the energization of the winding 40, and therefore the current value becomes "0".

At the time t6, because the rotor 50 is in a state to be positioned at "drive start position", the normal drive control of the brushless motor 4 can start at a time t7. After the time t7, a current flows into the brushless motor 4 with the normal drive control start (start) of the brushless motor 4.

Now, an operating example of a drive control device in a comparative example is illustrated in FIG. 8, and advantages of the first embodiment over the comparative example will become apparent.

FIG. 8 illustrates a change in a value (current value) of the current flowing in the brushless motor 4 from a state in which the rotor 50 is stopping after the normal drive control of the brushless motor 4 starts with time, by the drive control device in the comparative example. The drive control device in the comparative example is identical in physical configuration with the drive control device 90 according to the present embodiment, but does not perform a control for relaxing a collision energy of the shaft 60 at the time of positioning the rotor 50. For that reason, in the comparative example, the target value is a current value "Ib" about twice as large as the current target value "Ia" of the present embodiment. A first comparative example that does not perform the PI control is indicated by a dashed line, and a second comparative example that performs the PI control is indicated by a two-dot chain line.

In the first comparative example, the current value comes closer to the target value "Ib" while repeating overshoot and undershoot. After the time t1, the current value rapidly rises up to a maximum value IbMAX which are more than three times as large as the target value "Ia" of the present embodiment. Thereafter, the current value is varied in a range larger than "Ia" till the time t6. In the second comparative example, the current value becomes about twice of the current value in the present embodiment as a whole between the time t1 and the time t6, and converges on the target value "Ib".

As described above, in the case of the drive control device in the comparative examples, because the current value flowing in the brushless motor 4 is large at the time of positioning the rotor 50, there is a risk that the collision stress generated when the shaft 60 collides with the impeller 80 becomes larger. On the contrary, in the drive control device 90 according to the present embodiment, because the current value flowing in the brushless motor 4 is small at the time of positioning the rotor 50, the collision stress generated when the shaft 60 collides with the impeller 80 can be reduced.

The effects of the first embodiment described above will be described.

The drive control device 90 according to the present embodiment that controls the driving of the brushless motor 4 having the stator 30 on which the multi-phase winding 40 (U-phase winding 41, V-phase winding 42, W-phase winding 43) is wound, the rotor 50 that is rotatably disposed relative to the stator 30, and the shaft 60 that is disposed in the center of the rotor 50, has the one end 61 fitted into the hole 81 of the impeller 80, and rotates together with the rotor 50 includes the microcomputer 91.

The microcomputer 91 operates an energization output including at least one of a current, a voltage and a power, and controls a power to be supplied to the winding 40, thereby being capable of controlling the rotation of the rotor 50.

The microcomputer 91 has the positioning unit 920 and the torque acceleration control unit 93.

The positioning unit 920 controls the power to be supplied to the winding 40, to thereby position the rotor 50 at a drive start position which is a position of the rotor 50 relative to the stator 30 at which the drive control of the brushless motor 4 can start, before starting the drive control of the brushless motor 4.

The torque acceleration control unit 93 controls the power to be supplied to the winding 40 so that a torque acceleration, which is an acceleration of a torque output from the shaft 60 of the brushless motor 4, falls within a predetermined range that "the collision stress generated when the outer wall of the end 61 of the shaft 60 collides with the inner wall of the hole 81 of the impeller 80 is equal to or smaller than a predetermined value", when the rotor 50 is positioned by the positioning unit 920.

For that reason, in the present embodiment, when the rotor 50 is positioned before the drive control of the brushless motor 4 starts, the collision stress generated when the outer wall of the shaft 60 collides with the inner wall of the impeller 80 can be set to be equal to or smaller than the predetermined value. As a result, the abrasion and the damage of the impeller 80 caused when the outer wall of the shaft 60 collides with the inner wall of the impeller 80 can be suppressed. This effect is remarkable particularly in the case of controlling the driving of the brushless motor 4 which is large in the number of times of the on/off operation within the predetermined period.

In the present embodiment, the positioning unit 920 includes the positioning detection unit 921, the positioning determination unit 922, and the positioning processing unit 923. The positioning detection unit 921 rotates the stopping rotor 50 by energization of the winding 40, and detects a position of the rotor 50 relative to the stator 30. The positioning determination unit 922 determines the "drive start position" on the basis of the position of the rotor 50 which is detected by the position detection unit 921. The positioning processing unit 923 switches the energization of the winding 40 so as to position the rotor 50 at the "drive start position" determined by the positioning determination unit 922, to rotate the rotor 50.

As described above, in the present embodiment, the position of the rotor 50 is detected, the "drive start position" is determined on the basis of the detected position of the rotor 50, and the rotor 50 is positioned at the determined "drive start position". For that reason, a time required until the drive control of the brushless motor 4 starts can be reduced.

In the present embodiment, the brushless motor 4 is a three-phase brushless motor in which the three-phase winding 40 is wound on the stator 30. The positioning detection unit 921 energizes the winding 40 of two phases, and detects the position of the rotor 50 on the basis of the induced voltage generated in the deenergized phase. The positioning processing unit 923 energizes the winding 40 of three phases, and positions the rotor 50. As described above, the present disclosure is preferably applied to the three-phase brushless motor generally widely available.

In the present embodiment, the torque acceleration control unit 93 controls the power to be supplied to the winding 40 so that the torque acceleration after the outer wall of the shaft 60 has collided with the inner wall of the impeller 80 becomes larger than the torque acceleration before the shaft 60 collides with the impeller 80.

As a result, the rotor 50 can be quickly positioned at the "drive start position" while the collision stress when the shaft 60 collides with the impeller 80 is suppressed. For that reason, a time required until the drive control of the brushless motor 4 starts can be further reduced.

Further, in the present embodiment, the torque acceleration control unit 93 controls the power to be supplied to the winding 40 so that the torque acceleration becomes a predetermined target value under the PI control. For that reason, the torque acceleration of the shaft 60 can be smoothly brought closer to the target value, and a residual error from the target value can be eliminated. With the avoidance of remarkable overshoot, the torque acceleration of the shaft 60 can be maintained at the predetermined value (target value) or smaller.

The fuel pump drive system 100 according to the present embodiment includes a fuel pump 1 and the above-mentioned drive control device 90 that controls the driving of the brushless motor 4.

The fuel pump 1 includes the brushless motor 4 that can output the torque while rotating the shaft 60, the housing 5 that houses the brushless motor 4, the pump cover 10 that has the suction part 11 and covers one end of the housing 5, the cover end 20 that has the discharge part 21 and covers the other end of the housing 5, and the impeller 80 that has a hole 81 defined in the center of the impeller into which the end 61 of the shaft 60 is fitted, and pressurizes the fuel flowing from the suction part 11 and discharges the fuel from the discharge part 21 while rotating together with the shaft 60.

In the fuel pump drive system 100 according to the present embodiment, the collision stress generated when the outer wall of the shaft 60 collides with the inner wall of the impeller 80 can be reduced to a value equal to or smaller than the predetermined value when positioning the rotor 50 before the drive control starts. For that reason, the abrasion and the damage of the impeller 80 of the fuel pump 1 can be suppressed.

In the present embodiment, the one end 61 of the shaft 60 in the fuel pump 1 is formed so that a cross-section perpendicular to an axis is D-shaped (refer to FIG. 3). The hole 81 of the impeller 80 is formed into a D-shape corresponding to a cross-sectional shape of the end 61 of the shaft 60. The predetermined clearance is defined between the one end 61 of the shaft 60 and the hole 81 in a state where the one end 61 of the shaft 60 is fitted into the hole 81. When the rotor 50 is positioned relative to the fuel pump 1 configured as described above under the collision stress relaxation control by the above-mentioned drive control device 90, the abrasion and the damage of the impeller 80 can be effectively suppressed.

Second to Fourth Embodiments

A collision stress relaxation control at the time of positioning a rotor by a drive control device according to second to fourth embodiments of the present disclosure will be described with reference to FIGS. 9 to 12.

First, technical concepts and terminologies common to the respective embodiments, and symbols used commonly in the respective drawings will be described. FIGS. 9 to 12 are time charts illustrating a change in an energization output with time. In FIG. 8 described above, a current value actually flowing in a brushless motor 4 is represented by the axis of ordinate. On the contrary, the axis of ordinate in FIGS. 9 to 12 represents a current (target value) commanded to a three-phase inverter 95 as "energization output" by a microcomputer 91. Assuming that a feedback (PI) control is executed, it is assumed that a real value matches a target value.

In a positioning control according to the respective embodiments, a value of the energization output when a position of a rotor 50 is detected by a positioning detection unit 921 is called "first output value". For example, the first output value corresponds to a value of the energization output when an induced voltage generated in a deenergized phase is detected by two-phase energization, and the position of the rotor 50 is detected on the basis of the induced voltage.

In a positioning process by a positioning processing unit 923 after the positioning determination unit 922 determines a drive start position, and switches the energization, a value of the energization output of a three-phase energization until an outer wall of a shaft 60 collides with an inner wall of an impeller 80 is called "second output value".

In the first to fourth embodiment, the microcomputer 91 operates a "current" as the energization output, and controls the power to be supplied to the winding 40 from the three-phase inverter 95. In this situation, a symbol of the first output value is denoted by "I1", and a symbol of the second output value is denoted by "I2". Aside from this example, the microcomputer 91 may operate the voltage or the power as the energization output.

When the first output value "I1" is too small, there is a possibility that the torque acceleration of the shaft 60 does not sufficiently increase, and does not reach a rotating speed required for detecting an induced voltage of a deenergized phase. Then, because the mobility of the brushless motor 4 is reduced, a maximum value of at least the first output value "I1" needs to be set to be larger than a lower limit value for reaching a rotating speed at which the induced voltage can be detected. The lower limit value of the first output value "I1" is set as "I1MIN".

When the second output value "I2" is too large, there is a risk that the impeller 80 may be abraded or damaged due to the collision stress when the outer wall of the shaft 60 collides with the impeller 80. For that reason, the second output value "I2" needs to be set to be lower than a certain upper limit value so as to avoid the abrasion and the damage of the impeller 80. An upper limit value of the second output value "I2" is set "I2MAX".

Then, the meaning of times t0 to t7 commonly shown in the axis of abscissa in FIGS. 9 to 12 will be described.

The times t0 to t1 (section I) is a stop time of the rotor 50.

A two-phase energization for position detection is started at the time t1, and the position of the rotor 50 is detected on the basis of the induced voltage at the times t1 to t2 (section II). A value of the energization output in this situation is the first output value "I1".

At the time t2, the two-phase energization is switched to the three-phase energization, and the shaft 60 collides with the impeller 80 during the times t2 to t4 (section III). In this situation, a time until the shaft 60 collides with the impeller 80 is changed according to an initial position of the shaft 60 at the time t2 when the energization is switched. Therefore, the "latest timing" when the 60 collides with the impeller 80 is set to the time t4. A value of the energization output at this time is the second output value "I2".

At the times t4 to t6 (section IV), after the shaft 60 has collided with the impeller 80, the rotor 50 rotates, and is positioned at the drive start position. It is assumed that an allowable maximum value of the energization output in this stage is a third output value "I3" larger than the second output value "I2".

Upon completion of the positioning of the rotor 50 at the time t6, after the current value has been set to 0 at the times t6 to t7 (section V) once, the brushless motor 4 is started (the drive control is started) at the time t7. After the time t7 (section VI), the brushless motor 4 rotates in the forward rotation direction while being driven under the control.

Behavior at the times t0 to t1 and the times t6 to t7 is common in FIGS. 9 to 12. The time t3 used only in FIG. 9 and the time t5 used only in FIG. 10 will be described in the respective drawings.

Figure 9:
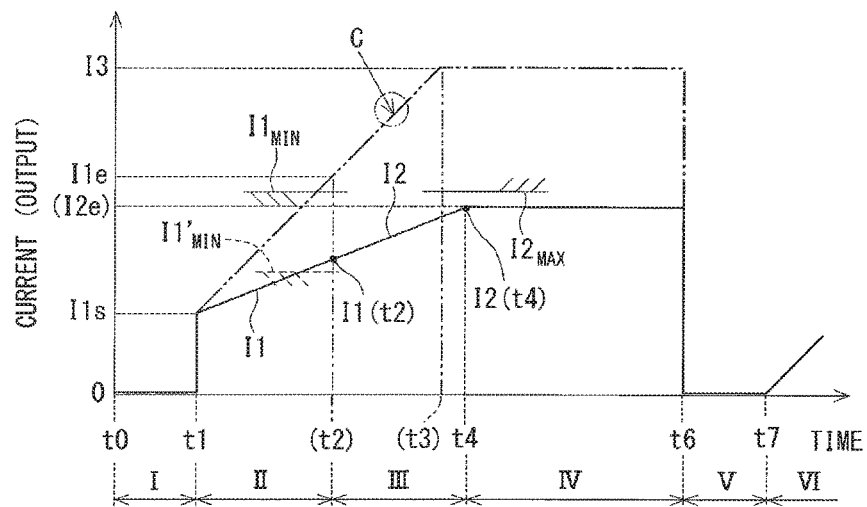
FIG. 9 is a time chart illustrating a collision stress relaxation control at the time of positioning the rotor according to the first embodiment of the present disclosure and a positioning control in the comparative example.

In FIG. 9, a current change in the first embodiment is indicated by a solid line, and a current change in the same comparative example as that in FIG. 8 is indicated by a two-dot chain line. In the first embodiment and the comparative example, the current is not changed before and after the time t2 for switching from the two-phase energization to the three-phase energization. Therefore, an inclination of the current at the time t2 is kept constant, and a value obtained by extending an increasing slope of the first output value "I1" at the times t1 to t2 until after the time t2 as it is the second output value "I2". In other words, in the first embodiment and the comparative example, the second output value "I2" is resultantly set to be larger than the first output value "I1".

In the comparative example, the current is increased at a constant slope since a start value I1s of the first output value "I1" at the time t1 until the start value reaches the third output value "I3" at the time t3, and the current at the time t4 exceeds an upper limit value "I2MAX" of the second output value "I2". For that reason, there is a possibility that crack is generated in the impeller 80 at certain timing C between the times t2 to t4 (section III).

On the other hand, in the first embodiment, in order to avoid the abrasion or the damage of the impeller 80, the current slope from the start value I1s of the first output value "I1" is reduced, and an end value I2e which is the second output value "I2 (t4)" at the time t4 is set to be smaller than the upper limit value "I2MAX" of the second output value "I2". Therefore, the collision stress when the shaft 60 collides with the impeller 80 can be relaxed.

In this situation, when the lower limit value of the first output value "I1" is relatively small as with "I1MIN" indicated by a dashed line, the mobility of the brushless motor 4 can be ensured even in the first embodiment. However, when the lower limit value of the first output value "I1" is relatively large as with "I1MIN" indicated by a solid line, because the first output value "I1 (t2)" at the time t2 falls below "I1MIN", there is a possibility that the first output value may not reach the rotating speed at which the induced voltage can be detected.

Under the circumstance, the following second to fourth embodiments aim at properly performing both of an improvement in the mobility of a brushless motor 4 and a damage prevention of an impeller 80 even when a lower limit value "I1MIN" of a first output value "I1" is relatively large. In those embodiments, the energization output is distinguished before and after a time t2 when switching from the two-phase energization to the three-phase energization, and a second output value "I2" after the time t2 is set to be smaller than the first output value "I1" before the time t2.

Figure 10:
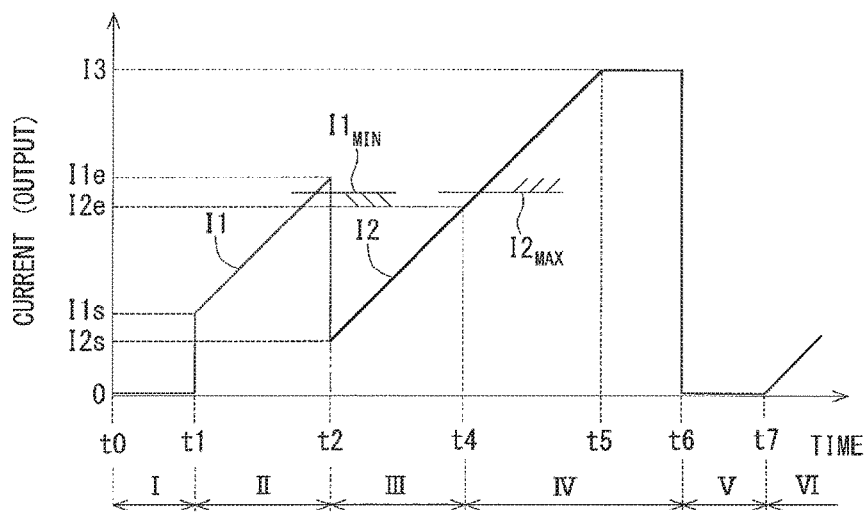
FIG. 10 is a time chart illustrating a collision stress relaxation control according to a second embodiment of the present disclosure.

In a second embodiment illustrated in FIG. 10, a first output value "I1" is increased at a constant slope from a start value I1s at a time t1 to an end value I1e of a time t2.

When an energization is switched at the time t2, a start value I2s of a second output value "I2" is set to a value lower than the end value I1e of the first output value. The second output value "I2" is increased at a constant slope from the start value I2s at the time t2 to an end value I2e of a time t4. The current is increased at the same slope even after the time t4, and after the current reaches a third output value "I3" at a time t5, the current is maintained at a constant value ("I3") till a time t6.

As described above, the current is changed in a saw-type shape in the second embodiment. The end value I1e of the first output value is set to exceed the lower limit "I1MIN", and the end value I1e of the second output value is set to fall below the upper limit value "I2MAX".

As described above, in the second embodiment, the torque acceleration control unit 93 sets "the second output value "I2" which is a value of the energization output until the outer wall of the shaft 60 collides with the inner wall of the impeller 80 in a positioning process by the positioning processing unit 923 after the position determination unit 922 determines the drive start position, and switches the energization" to be smaller than "the first output value "I1" which is a value of the energization output when the position detection unit 921 detects the position of the rotor 50".

As a result, at the time of detecting the position, the first output value "I1" is increased, and can reach the rotating speed for sufficiently detecting the induced voltage. On the other hand, at the time of collision of the shaft 60 in the positioning process, the second output value "I2" is reduced to suppress the collision energy, and the collision stress can be relaxed. Therefore, an improvement in the mobility of the brushless motor 4 and a damage prevention of the impeller 80 can be suitably performed.

In the following third and fourth embodiments, only differences from the above embodiments will be described.

Figure 11:
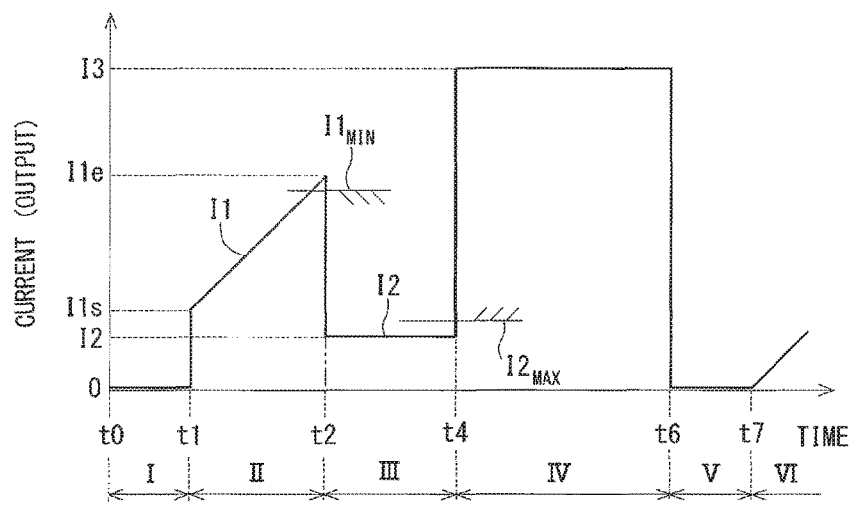
FIG. 11 is a time chart illustrating a collision stress relaxation control according to a third embodiment of the present disclosure.

In the third embodiment illustrated in FIG. 11, as compared with the second embodiment, a second output value "I2" at times t2 to t4 is set to be constant, and a current is increased from the second output value "I2" to a third output value "I3" in a stepwise manner at a time t4.

As described above, because a time when the shaft 60 collides with the impeller 80 is changed according to an initial position of the shaft 60, in the second embodiment where the second output value "I2" is gradually increased from the time t2, the current at the time of collision is varied. Under the circumstance, in the third embodiment, the second output value "I2" is kept constant with the result that the collision energy at the time of collision is equalized regardless of the initial position of the shaft 60, and a product quality can be stabilized. When the upper limit value I1MIN is set to be smaller, a safety factor for the occurrence of abrasion and damage can be increased.

Figure 12:
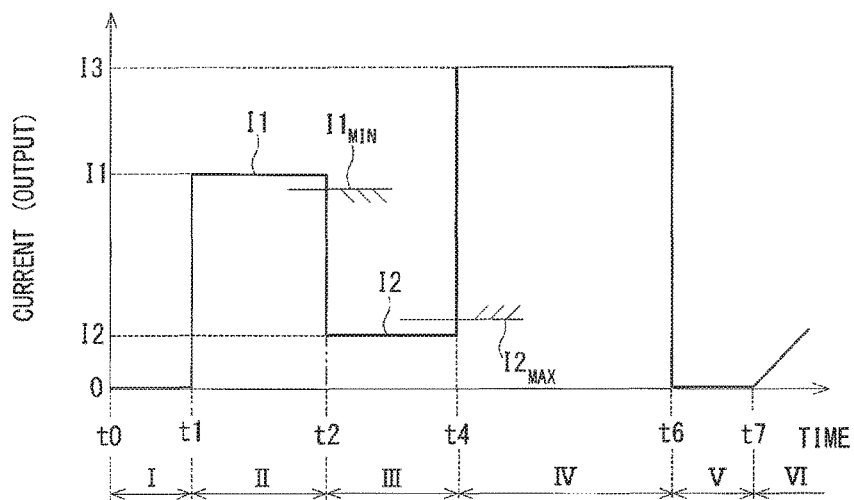
FIG. 12 is a time chart illustrating a collision stress relaxation control according to a fourth embodiment of the present disclosure.

In a fourth embodiment illustrated in FIG. 12, as compared with the third embodiment, a current is increased from 0 to a first output value "I1" in a stepwise fashion at a time t1, and the first output value "I1" is set to be constant at the times t1 to t2. As a result, the rotating speed at the time of detecting the position is rapidly increased, and a time for position detection can be reduced.

Other Embodiments

In another embodiment of the present disclosure, a positioning unit 920 may position a rotor 50 without performing position detection by a positioning detection unit 921 and the determination of "drive start position" by a positioning determination unit 922. For example, as disclosed in JP H4-312390 A, a certain fixed phase is energized for a predetermined time to perform a first positioning, and thereafter the remaining phases are energized for a predetermined time to perform a second positioning, thereby being capable of positioning the rotor 50.

In another embodiment of the present disclosure, when the positioning unit 920 positions the rotor 50, the number of energization is not limited to two, but a winding 40 may be energized many times. In other words, the energization of the winding 40 may be switched many times. For example, the energization may be performed for position detection of the rotor 50 multiple times, and the energization may be performed for positioning the rotor 50 multiple times.

In another embodiment of the present disclosure, a torque acceleration control unit 93 may not control the power to be supplied to the winding 40 so that the torque acceleration after the outer wall of a shaft 60 has collided with the inner wall of an impeller 80 becomes larger than the torque acceleration before the shaft 60 collides with the impeller 80. In other words, the torque acceleration may be controlled to be equal to each other before and after the shaft 60 collides with the impeller 80, or the torque acceleration after collision may be controlled to be smaller than that before the collision.

In another embodiment of the present disclosure, the torque acceleration control unit 93 may not control the power to be supplied to the winding 40 so that the torque acceleration becomes a predetermined target value under the PI control. In other words, the torque acceleration may be controlled in a method other than the PI control such as a proportional control that does not perform an integral control.

In another embodiment of the present disclosure, a cross-sectional shape of an end of a shaft of a fuel pump, and a shape of a hole of an impeller are not limited to a D-shape, but may be formed into any shape such as an I-shape or a polygonal shape. The shaft and the impeller may be coupled with each other by a spline coupling.

The drive control device according to the present disclosure is not limited to the three-phase brushless motor, but may be used for a drive control of a brushless motor having a stator on which windings of four or more phases are wound. The drive control device is not limited to the drive control of the brushless motor for the fuel pump, but may be used for the drive control of the brushless motor provided in another device.

As described above, the present disclosure is not limited to the embodiments described above, and can be applied to various embodiments without departing from the spirit of the present disclosure.

The invention claimed is:

1. A drive control device that controls the driving of a brushless motor having a stator on which multi-phase windings are wound, a rotor that is disposed to be rotatable relative to the stator, and a shaft that is disposed in the center of the rotor, has an end fitted into a hole of a rotating member and rotates together with the rotor, the drive control device comprising:
a control unit that operates an energization output including at least one of a current, a voltage and a power, and controls a power to be supplied to the windings to make the rotation of the rotor controllable, wherein
the control unit includes:
a positioning unit that controls the power to be supplied to the windings to position the rotor at a drive start position which is a position of the rotor relative to the stator which can start the drive control of the brushless motor, before starting the drive control of the brushless motor; and
a torque acceleration control unit that controls the power to be supplied to the windings to allow a torque acceleration, which is a time variation in a torque output from the shaft, to fall within a predetermined range that the collision stress generated when the outer wall of the shaft collides with the inner wall of the rotating member is equal to or smaller than a predetermined value, when the rotor is positioned by the positioning unit.

2. The drive control device according to claim 1, wherein the positioning unit includes:
a position detection unit that energizes the multi-phase windings, rotates the stopped rotor, and detects a position of the rotor relative to the stator;
a position determination unit that determines the drive start position on the basis of the position of the rotor which is detected by the position detection unit; and
a positioning processing unit that switches the energization of the multi-phase windings and rotates the rotor to position the rotor at the drive start position determined by the position detection unit.

3. The drive control device according to claim 2, wherein the torque acceleration control unit sets a second output value which is a value of the energization output until the outer wall of the shaft collides with the inner wall of the rotating member to be smaller in a positioning process by the positioning processing unit after the position determination unit determines the drive start position, and switches the energization, than a first output value which is a value of the energization output when the position detection unit detects the position of the rotor.

4. The drive control device according to claim 3, wherein the second output value is set to be constant.

5. The drive control device according to claim 2, wherein the brushless motor is a three-phase brushless motor in which three-phase windings are wound on the stator,
the position detection unit energizes the windings of two phases, and detects the position of the rotor on the basis of an induced voltage developed in a deenergized phase, and
the positioning processing unit energizes the windings of three phases, and positions the rotor.

6. The drive control device according to claim 1, wherein the torque acceleration control unit controls the power to be supplied to the wirings to make the torque acceleration after the outer wall of the shaft collides with the inner wall of the rotating member larger than the torque acceleration before the shaft collides with the rotating member.

7. The drive control device according to claim 1, wherein the torque acceleration control unit controls the power to be supplied to the windings to keep the torque acceleration at a predetermined target value under a PI control.

8. A fuel pump drive system comprising:
a fuel pump including a brushless motor that can output a torque with the rotation of a shaft, a housing that houses the brushless motor, a pump cover that has a suction part and covers one end of the housing, a cover end that has a discharge part and covers the other end of the housing, and a rotating member that has a hole defined in the center of the rotating member into which an end of the shaft is fitted, and rotates together with the shaft to pressurize a fuel flowing from the suction part and discharge the fuel from the discharge part; and
a drive control device that controls the driving of the brushless motor according to claim 1.

9. The fuel pump drive system according to claim 8, wherein
the end of the shaft is formed into a D-shape in a cross-section perpendicular to an axis,
the hole is formed into a D-shape corresponding to the cross-sectional shape of the end of the shaft, and
a predetermined clearance is defined between the end of the shaft and the hole in a state where the end of the shaft is fitted into the hole.

* * * * *